US008650102B2

(12) United States Patent
Doi et al.

(10) Patent No.: US 8,650,102 B2
(45) Date of Patent: Feb. 11, 2014

(54) FOREIGN EXCHANGE COVERED WARRANT SYSTEM AND STRUCTURE

(75) Inventors: Masatsugu Doi, Tokyo (JP); Fujita Naosuke, Tokyo (JP)

(73) Assignee: Goldman, Sachs & Co., New York, NY (US)

(*) Notice: Subject to any disclaimer, the term of this patent is extended or adjusted under 35 U.S.C. 154(b) by 1126 days.

(21) Appl. No.: 10/480,984

(22) PCT Filed: Jun. 18, 2002

(86) PCT No.: PCT/US02/19418
§ 371 (c)(1),
(2), (4) Date: Jun. 8, 2004

(87) PCT Pub. No.: WO02/103489
PCT Pub. Date: Dec. 27, 2002

(65) Prior Publication Data
US 2004/0215539 A1    Oct. 28, 2004

Related U.S. Application Data

(60) Provisional application No. 60/299,319, filed on Jun. 19, 2001, provisional application No. 60/300,150, filed on Jun. 22, 2001.

(51) Int. Cl.
*G06Q 40/00* (2012.01)
(52) U.S. Cl.
USPC ......................................................... 705/35
(58) Field of Classification Search
None
See application file for complete search history.

(56) References Cited

U.S. PATENT DOCUMENTS

| | | | |
|---|---|---|---|
| 5,003,473 A | 3/1991 | Richards | |
| 5,675,746 A * | 10/1997 | Marshall | 705/35 |
| 5,819,238 A | 10/1998 | Fernholz | |
| 6,018,721 A | 1/2000 | Aziz et al. | |
| 6,073,115 A | 6/2000 | Marshall | |
| 6,947,901 B1 * | 9/2005 | McCabe et al. | 705/26 |
| 7,340,433 B1 * | 3/2008 | Kay et al. | 705/38 |
| 7,395,232 B1 * | 7/2008 | Pilato | 705/35 |
| 2002/0035534 A1 * | 3/2002 | Buist et al. | 705/37 |
| 2002/0087455 A1 * | 7/2002 | Tsagarakis et al. | 705/37 |
| 2002/0107766 A1 * | 8/2002 | Sioufi | 705/35 |
| 2002/0138299 A1 * | 9/2002 | Nations | 705/1 |
| 2002/0156718 A1 * | 10/2002 | Olsen et al. | 705/37 |
| 2003/0014345 A1 * | 1/2003 | Lim | 705/36 |

OTHER PUBLICATIONS

Richard Madsen, China's Complexities Befuddle U.S., Jun. 25, 1998, USA Today, p. 15A.*

(Continued)

*Primary Examiner* — Virpi Kanervo
(74) *Attorney, Agent, or Firm* — Perkins Coie LLP (57) ABSTRACT

A financial data processing system includes a foreign exchange (FX) certificate management system, a covered warrant management processor, and a trade processing system. The FX certificate management system includes a computer system configured to structure a zero-coupon FX certificate. The certificate is structured to have a redemption value that is determined based on a currency exchange rate measured at a time of maturity of the certificate. The covered warrant management processor includes a computer system configured to structure a FX covered warrant product based on an underlyer that includes a foreign exchange certificate structured by the FX certificate management system. The trade processing system includes a database storing buy and sell related data and tracking investor portfolio information, and a user interface system to generate user interface display screens enabling interaction with a user.

22 Claims, 5 Drawing Sheets

(56) References Cited

OTHER PUBLICATIONS

Anonymous, Financial Market Trends, Paris, Nov. 1966, Issue 65, p. 103.*
Richard Madsen; China's Complexities Befuddle U.S.; USA Today; Jun. 25, 1998.*
Anonymous; Financial Market Trends; Paris: Nov. 1996; Issue 65; p. 103.*
Financial Market Trends; Article by Anonymous; Paris: Nov. 1996, Issue 65; p. 103.*
China's Complexities Befuddle U.S.; Article by Richard Madsen; USA Today; Jun. 25, 1998.*
Anonymous; Financial Market Trends; Paris: Issue 65, p. 103; Nov. 1996.*
Koch, Sandra Idelle; Empirical Evidence of Pricing Efficiency in Niche Markets; The University of North Texas; Ph.D. Dissertation; 2000.*
Kristensen, Scott Dennis; A New Monetary Model of Foreign Exchange Rates; The University of Arizona; Ph.D. Dissertation; 1997.*
Sobel, Andrew Carl; The Internationalization of Securities Markets and the Political Economy of Market Opening; The University of Michigan; Ph.D. Dissertation; 1992.*
Inside Market Data, "Reuters Readies Derived Data Set for OTC Derivatives," vol. 9, No. 10, 1 page, Feb. 14, 1994.
International Application No. PCT/US2002/019418, International Search Report, 3 pages, May 23, 2003.

* cited by examiner

Fig. 1

| | |
|---|---|
| Issuer: | <<Issuer Identification>> |
| Guarantor: | <<Guarantor Identification>> |
| Guarantee: | Irrevocable and unconditional; the guarantee relates to payment obligations only |
| Lead Manager: | <<Manager Identification>> |
| Common Depositary: | <<Depositary Identification>> |
| Issue Size: | 100,000 Certificates |
| Issue Price: | JPY 123 |
| Strike Price: | JPY 0 |
| Trade Date: | July 17, 2001 |
| Issue Date: | July 25, 2001 |
| Exercise Period: | July 26, 2001 - June 20, 2006 |
| Expiration Date: | June 20, 2006 |
| Settlement Date: | Valuation Date + 3 Tokyo Business Days |
| Exercise Style: | American |
| Valuation Date: | The Tokyo business day after which the Certificates are exercised, or the Expiration Date, whichever is earlier, as provided in the Terms and Conditions of the Certificates. |
| Certificate Rights: | Each Certificate entitles the holder, in accordance with the Terms and Conditions of the Certificates, to receive the amount (if positive) in Japanese Yen by which the Market Value on Valuation Date exceeds the Strike Price. |
| Market Value: | USD 1 converted into JPY at the mean USDJPY Exchange Rate as quoted on Reuters Page JPNU on at 9:00 AM Tokyo Time on the Valuation Date. |
| Listing: | None |
| Secondary Trading: | The Issuer expects to make a market in the Certificates |
| Trading Size: | Multiples of 1 Certificate |
| Minimum Exercise: | 1 Certificate and multiples of 1 thereafter |
| Calculation Agent: | <<Calculating Agent Identification>> |
| Clearing: | <<Clearing Agent Identification>> |

Fig. 2

CALL WARRANTS ON
JPY/USD Certificate
MATURITY JAN 24, 2002

| | |
|---|---|
| Issuer: | <<Issuer Identification>> |
| Guarantor: | <<Guarantor Identification>> |
| Guarantee: | Irrevocable and unconditional; the guarantee relates to payment obligations only. |
| Lead Manager: | <<Manager Identification>> |
| Common Depositary: | <<Depository Identification>> |
| Issue Size: | 100,000,000 Warrants |
| Issue Price: | JPY 28.69 |
| Trade Date: | July 17, 2001 |
| Issue Date: | July 25, 2001 |
| Strike Price: | JPY 120 |
| Reference: | JPY 123 |
| Premium: | 2.23% |
| Delta/Gearing: | 0.53 / 21.42 x |
| Exercise Period: | Jan 24, 2002 (the Expiration Date) |
| Expiration Date: | Jan 24, 2002 |
| Exercise Style: | European |
| Exercise: | Each 0.2 warrants entitles the holder, in accordance with the Terms and Conditions, to receive an amount in Japanese Yen equal to the excess (if positive) of the Market Value on the Valuation Date over the Strike Price |
| Market Value: | Price of the Underlying Asset at 9AM Tokyo Time |
| Underlying Asset: | Identification of issued Certificates on JPY/USD |
| Valuation Date: | Expiration Date |
| Listing: | None |
| Secondary Trading: | The Issuer expects to make a market in the Warrants |
| Trading Size: | 1000 Warrants and multiples of 1000 thereafter |
| Minimum Exercise: | 1000 Warrants and multiples of 1000 thereafter |
| Calculation Agent: | <<Agent Identification>> |
| Clearing: | <<Clearing Agent Identification>> |

| | | | | |
|---|---|---|---|---|
| Issuer / Lead Manager | <<Issuer Identification>> | | | |
| Guarantor: | <<Guarantor Identification>> | | | |
| Guarantee: | Irrevocable and unconditional, the guarantee relates to payment obligations only. | | | |
| Lead manager: | <<Lead Manager Identification>> | | | |
| Common Depositary: | <<Depository Identification>> | | | |
| Issue Size: | 00,000,000 Warrants | | | |
| Trade Date: | XX/XX/2001 | | | |
| Issue Date: | XX/XX/2001 | | | |

| | Tranche A | Tranche B | Tranche C | Tranche D |
|---|---|---|---|---|
| Issue Type: | Call | Call | Put | Put |
| Exercise Period: | XX July, 200X | XX July, 2006 | XX July, 200X | XX July, 200X |
| Expiration Date: | XX July, 200X | XX July, 2006 | XX July, 200X | XX July, 200X |
| Strike Price: | JPY 110 | JPY 120 | JPY 100 | JPY 90 |
| Issue Price: | JPY XX.XX | JPY XX.XX | JPY XX.XX | JPY XX.XX |
| Premium: | XX.XX% | XX.XX% | XX.XX% | XX.XX% |
| Delta / Gearing: | X.XXX / X.XXX | X.XXX / X.XXX | X.XXX / X.XXX | X.XXX / X.XXX |
| Common Code: | TBA | TBA | TBA | TBA |

| | | | | Quote | |
|---|---|---|---|---|---|
| Index Constituents: | Floating Rate Note | RIC | Multiplier | Currency | GS FX Index |
| (15 Floating Notes) | 1. Note A | AAA | 0.002025 | USD | 0.2004 |
| | 2. Note B | BBB | 0.002025 | USD | 0.2007 |
| | 3. Note C | CCC | 0.002025 | USD | 0.2006 |
| | 4. Note D | DDD | 0.002025 | USD | 0.2007 |
| | 5. Note E | EEE | 0.002025 | USD | 0.1975 |
| | | | | Total | 1.0000 |

| | |
|---|---|
| Index Value: | 1.0000 (GS FX Index) times the JPY/USD spot exchange rate. |
| Exercise (Call): | Each Warrant entitles the holder, in accordance with the Terms and Conditions, to receive an amount in Japanese Yen (if positive) equal to the excess of the JPY/USD spot exchange rate on the Expiry Date over the Strike Price. |
| Exercise (Put): | Each Warrant entitles the holder, in accordance with the Terms and Conditions, to receive an amount in Japanese Yen (if positive) equal to the excess of the Strike Price over the JPY/USD spot exchange rate on the Expiry Date. |
| Exercise Style: | European |
| Secondary Trading: | The Issuer expects to make a market in the Warrants. |
| Trading Size: | 1000 Warrants and multiples of 1000 thereafter. |
| Minimum Exercise: | 1000 Warrants and multiples of 1000 thereafter. |
| Calculation Agent: | <<Calc. Agent. ID>>    Listing Agent:  None    Clearing Agent:    <<Clearing Agent ID>> |

Fig. 5

FOREIGN EXCHANGE COVERED WARRANT SYSTEM AND STRUCTURE

CROSS-REFERENCE(S) TO RELATED APPLICATIONS

This application claims priority to PCT/US02/19418, filed Jun. 18, 2002, which claims the benefit of the filing date of U.S. provisional application Ser. No. 60/299,319 entitled "USD Covered Warrant" which was filed on Jun. 19, 2001 and of U.S. Provisional application Ser. No. 60/300,150 entitled "FX eWarrants" which was filed on Jun. 22, 2001.

FIELD OF THE INVENTION

This invention is related to a financial process which facilitates structuring of a covered warrant financial product having an underlyer linked to a foreign exchange (FX) rate.

BACKGROUND OF THE INVENTION

A warrant is an agreement establishing an option to purchase or sell a security, cash commodity, forward, futures contract, swap, or other contract or instrument ("the "underlying") which is the subject of a derivative contract or instrument at a given price and time or at a series of prices and times as outlined in the warrant agreement. A warrant differs from a put or call option in that it is ordinarily issued for a period in excess of one year. Warrants may be issued alone or in connection with the sale of other securities, as part of a merger or recapitalization agreement, and, occasionally, to facilitate divestiture of the securities of another corporation.

A covered warrant is a stock, basket, or index warrant issued by a party other than the issuer of the underlying stock(s) and secured by the warrant issuer's holding in the underlying securities or the warrant issuer's general credit standing. Ordinarily, exercise of a common stock warrant sold by the issuer of the underlying increases the number of shares of stock outstanding, whereas a call or a put covered warrant is an option on shares already outstanding. Covered warrants are often issued by investment banks when transfer of the underlying security is temporarily or permanently restricted, when traditional warrants are not available, or when buyers want security and currency warrant combinations not otherwise available in the market. Covered warrants may also be referred to by other names such as synthetic warrants and third party warrants.

The structure of a covered warrant typically ensures that holders will always have a 'long' position, be it with calls or puts, such that the maximum loss is confined to the premium paid. Generally speaking, if the underlyer is stock or Government securities, the settlement of the covered warrants can take place, consistent with what is indicated in the prospectus, by means of physical delivery of the underlying asset or through monetary payment. Covered warrants on other categories of underlying assets, such as index warrants, may be cash settled.

The underlyer permitted in a covered warrant structure may be regulated and restricted by the jurisdiction in which the structure is offered. For example, it is uncertain whether Japan's Securities Exchange Law (SEL) permits a covered warrant where a foreign exchange rate acts as an underlyer. Although covered warrants using FX rates as direct underlyer have been offered in some jurisdictions, this structure may be inappropriate in certain jurisdictions as legal definition of warrants can differ by region. For example, in Japan, securities brokers can only sell qualified products under the SEL. Although warrants were permitted under the SEL following a December 1998 revision, the SEL defines warrants in very narrow scope compared with other jurisdictions. To be qualified as a warrant under Japanese SEL, the underlying assets should be either securities under SEL or indexes on securities basket. Therefore, it appears that warrants on FX rates or interest rates are not "warrants" in Japan and securities companies may have difficulties offering them. Moreover, in some jurisdictions, tax treatment are unfavorable for warrants on simple FX rates or interest rates as they are deemed as options. Also, some believe that, in extreme cases, unqualified warrants may be regarded under the SEL as a violation of criminal code which prohibits gambles. Thus, the requirement made existing product structures offering covered warrants on foreign exchange rate fluctuations in unusable in Japan. Other problems with warrant structures may exist in other jurisdictions. Consequently, covered warrant advantages may be limited in certain jurisdictions.

SUMMARY OF THE INVENTION

The present invention provides a class of tradable covered warrants using a "surrogate" underlyer. In a preferred implementation, the surrogate underlyer is a zero-coupon certificate with a redemption value that is linked to a foreign exchange ("FX") rate (i.e., a FX certificate). This covered warrant structure may model performance of a covered warrant having a foreign exchange rate as a direct underlyer where, in fact, the direct underlyer is not a foreign exchange rate. Such a structure can be employed to meet requirements of various markets that would not be met employing a foreign exchange rate as a direct underlyer.

In general, in one aspect, the invention includes a foreign exchange covered warrant financial product (A "FX covered warrant"). The underlyer for this covered warrant product includes a foreign exchange certificate. The certificate may be a zero-coupon certificate structured as a debenture securitizing a foreign exchange option and having a redemption value that is determined based on a currency exchange rate. The redemption value may be determined based on the amount by which a first value at a maturity date exceeds a strike price and may be zero if the first value doesn't exceed the strike price. The first value may be dependent on a difference in exchange rates measure between a rate at a maturity date and a rate at an issue date. In another aspect, the invention includes methods for issuance of a FX covered warrant financial product.

In general, in another aspect, the invention features a financial data processing system. The system includes a foreign exchange certificate management system, a covered warrant management processor, and a trade processing system. The foreign exchange certificate management system includes a computer system configured to structure a zero-coupon foreign exchange certificate. The structure of this certificate includes a price computed based on a data feed received from a foreign exchange trading system. Further, the certificate is structured to have a redemption value that is determined based on a currency exchange rate at a time of maturity of the certificate. The covered warrant management processor includes a computer system configured to structure a covered warrant product based on an underlyer that includes a foreign exchange certificate structured by the foreign exchange certificate management system. The trade processing system includes a database storing buy and sell related data and tracking investor portfolio information, and a user interface system to generate user interface display screens enabling interaction with a user.

The trade processing system may also include a price management system configured to automatically halt trading of the covered warrant product when a price change for the covered warrant product exceeds a first threshold. The price management system can be further configured to halt dissemination of price information when a change in a reference price of the underlyer exceeds a second threshold. The price change for the covered warrant may be measured over a first window of time and the change in the reference price may be measured over a second (and possibly different) window of time.

In general, in another aspect, the invention features a computer-implemented method of offering a financial product. The method includes receiving a data feed that includes foreign exchange rate data, computing a price of a zero-coupon foreign exchange certificate based on the received foreign exchange rate data, computing a price of a foreign exchange covered warrant that includes an underlyer where the underlyer is (or includes) the zero-coupon foreign exchange certificate, and transmitting offer data to an investor. The offer data includes information descriptive of the foreign exchange covered warrant. The method may also include receiving a request for an offer of the foreign exchange covered warrant and transmitting the offer data in response to the request.

Implementations may include one or more of the following features. A value of the foreign exchange certificate at the time of issuance of the certificate can be calculated based on a data feed received from a computerized foreign exchange trading system. The data feed, and associated certificate price calculations may occur in real-time. The certificate price may also be computed based on factors such as a funding rate, a charging rate, and a date of redemption. A single entity can function as an issuer of the certificate and as a market maker for the covered warrant product. The covered warrant product may be issued in tranches having a set issue size, issue price, strike price, warrant type, and maturity date, and the issue may be managed by a computerized trading system. The method can also include monitoring a change in underlyer price based on a previous closing price and halting investor trading when a rate of change of the underlyer price during a pricing window exceeds a permissible rate of change. Structuring the underlyer may include structuring at a bid-offer spread to enable operation of the certificate as an investor trading vehicle. The certificate may have an associated strike price which is a price per share at which the underlying may be purchased in the case of a call or sold in the case of a put by a holder of the certificate upon exercise of an associated option contract. The underlyer may be structured as a debenture and may operate to securitize a foreign exchange option.

More generally, the present invention allows creation of an instrument securitizing a foreign exchange rate fluctuation. The securitization instrument can operate as a proxy for trading in the foreign exchange market.

Implementations may provide advantages such as a broadened array of financial products that can be issued in compliance with regulatory requirements. Other features, objects, and advantages of the invention will be apparent from the accompanying drawings, description, and claims, below.

DESCRIPTION OF THE DRAWINGS

FIGS. 2, 3, and 5 show term details related to financial product offers.

DETAILED DESCRIPTION OF THE INVENTION

To enhance investing opportunities, it is desirable to have a covered warrant product structured to behave as if it were based on a particular underlyer (e.g., a foreign exchange rate) while, in fact, being based on another underlyer (a "surrogate" underlyer). This surrogate underlyer structure may provide additional flexibility with respect to the types and economic effect of covered warrants that may be offered.

In general, in one aspect, the invention includes a foreign exchange (FX) covered warrant financial product (A "FX covered warrant"). The underlyer for this covered warrant product includes a FX certificate. The FX certificate may be a zero-coupon certificate structured as a debenture securitizing a foreign exchange option and having a redemption value determined based on a currency exchange rate. The redemption value may be determined based on the amount by which a first value at a maturity date exceeds a strike price and may be zero if the first value doesn't exceed the strike price. In another aspect, the invention includes methods for issuance of a FX covered warrant financial product.

Figure 1:
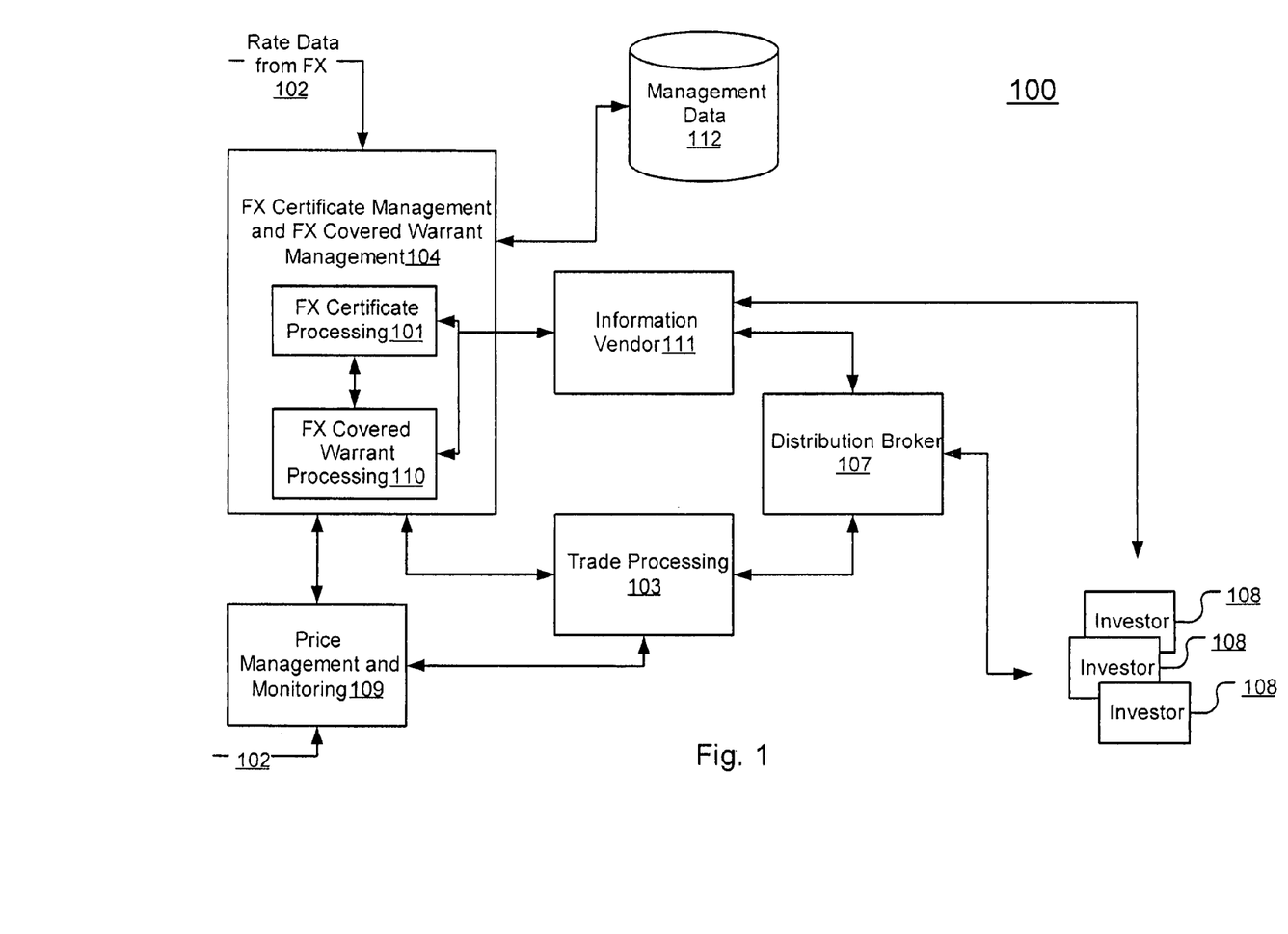
FIG. 1 shows the flow of information in a FX covered warrant processing system.
Figure 2:
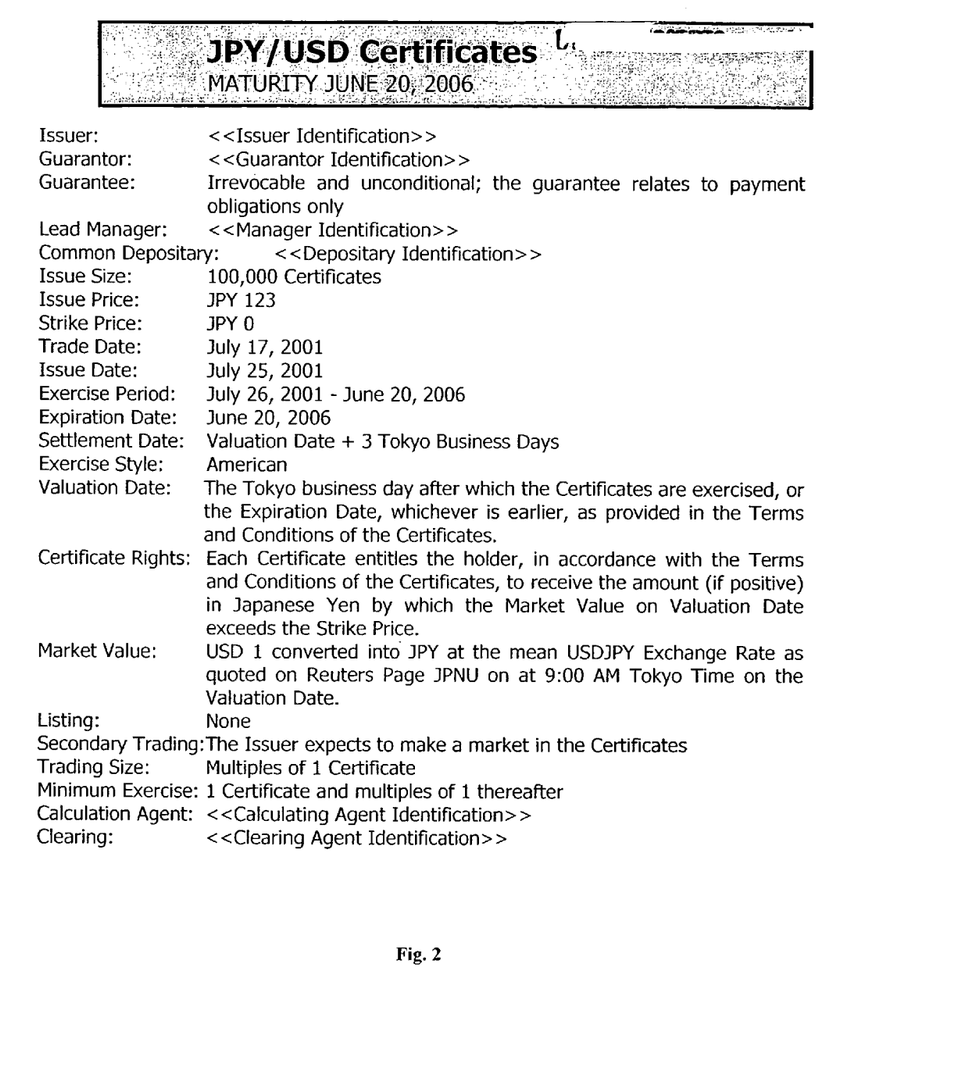
Figure 3:
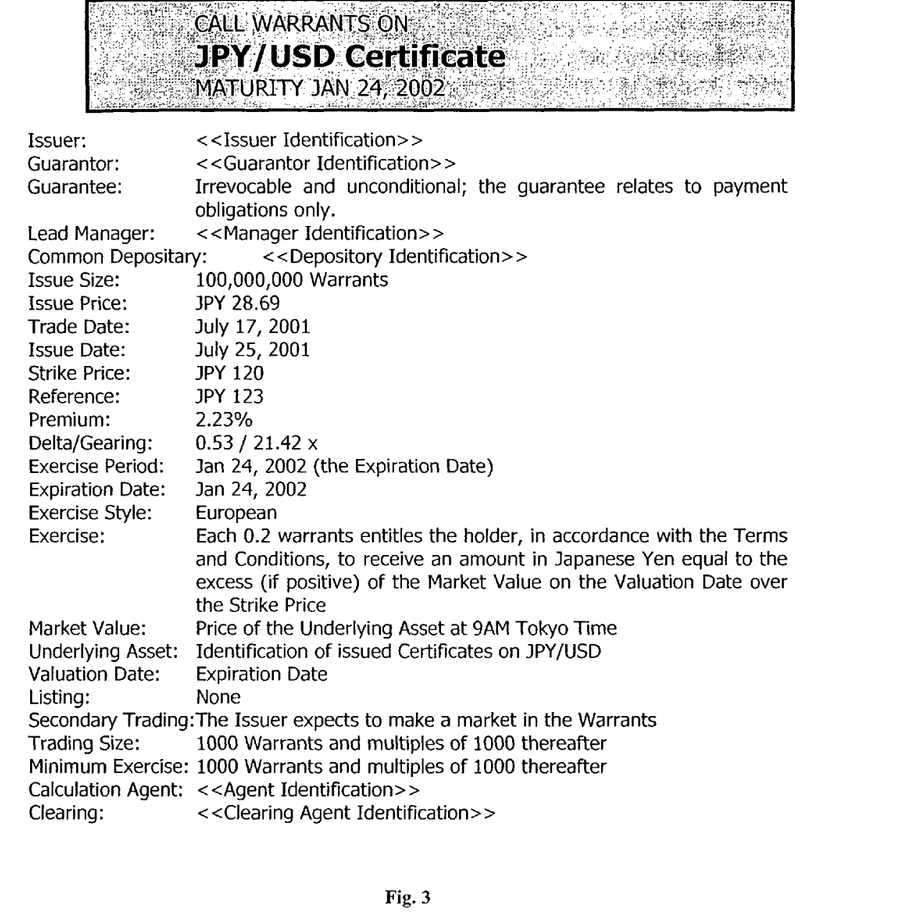

FIG. 1 shows an exemplary flow of information in a financial data processing system 100 that can be used to process and issue FX covered warrants. Functions implemented by the system 100 include receiving a data feed that includes foreign exchange rate data, computing a price of a zero-coupon foreign exchange certificate based on the received foreign exchange rate data, computing a price of a foreign exchange covered warrant that includes an underlyer where the underlyer is (or includes) the zero-coupon foreign exchange certificate, and transmitting offer data to an investor. The offer data can include information descriptive of both FX certificates and FX covered warrants having the FX certificates and underlyers. As an example, the offer data may include the data shown in FIG. 2 for a FX Certificate and the data shown in FIG. 3 for a FX warrant. The method may also include receiving a request for an offer of the foreign exchange covered warrant and transmitting the offer data in response to the request.

The system 100 includes, among other things, a FX certificate and FX covered warrant management and processing system 104, price management system 109, and a trade processing system 103. The FX certificate and covered warrant management system 104 is a computer system configured to generate pricing information for FX covered warrants and associated zero-coupon FX certificate and to manage the dissemination of that information to other components of the system 100. The system 104 is further composed of a FX certificate price calculation engine 101 and a FX warrant price calculation engine 110.

The calculation engine 101 determines FX certificate prices based on, among other things, a FX rate date feed 102 received from a foreign exchange trading system. The FX certificate price may also be computed based on factors such as a funding rate, a charging rate, and a date of redemption. Generally speaking the funding rate is the borrowing rate of the issuer at money market, the charging rate is a rate covering handling expenses relating to the exercise of the note. For example, in the case of a FX certificate on a U.S. $ for Japanese Yen (JPY) exchange, price may be calculated according to the formula:

$$\text{FX Certificate Price} = \frac{\text{Spot \$1 equivalent value expressed in JPY on a designated data feed screen}}{(1 + \text{Funding Rate} - \text{Charging Rate})\left(\frac{\text{days from exercise to settlement}}{365}\right)}$$

The FX certificate price is then used to determine the FX warrant price by engine 110. Preferably, the FX certificate price calculations are updated in real time as FX rate data is received by the data feed 102.

After FX certificate and FX warrant price calculations, these prices are distributed to investors. Distribution to investors 108 can occur via an information vendor 111 (e.g., through Reuters or Quick price dissemination systems), or via a trading system 103 and distribution broker 107. The system 104 may structure the underlyer (i.e., the FX certificate) so that it is offerable at a bid-offer spread enable operation of the FX certificate as an investor trading vehicle. This may be accomplished through the monitoring of pricing and trade information from system 103. For example, feedback from the system 103, which may be stored as management data 112, can be used to determine whether the bid-offer spread is appropriate to encourage investor trading. The FX certificate may have an associated strike price which is a price per share at which the underlying asset may be purchased in the case of a call or sold in the case of a put by a holder of the FX certificate upon exercise of an associated option contract. The underlyer may be structured as a debenture and may operate to securitize a foreign exchange option.

The FX certificate structured by the systems 104 is structured to have a current value equal to the spot currency exchange rate. Further, the covered warrant management processing sub-component 110 of the system 104 is configured to structure a covered warrant product based on an underlyer that includes a FX certificate structured by the FX certificate management sub-component 101. The trade processing system 103 includes a database storing buy and sell related data and tracking investor portfolio information. Offer information generated and managed by the trade management system 103 can be provided over a data line to a distributing broker 107 that, in turn, manages sale of the FX covered warrant to investors 108.

The system 103 can also process and manage sale of the underlying FX certificates to investors 108. Sale to investors 108 also may be accomplished via a computer system that generates user interface display screens to provide data to, and to enable interaction with, the investors 108. Alternatively, the trade system 103 may be configured to interact directly with the investors 108. Still other alternatives are available for investor interaction such as manual (e.g., voice phone call) interaction with investors by brokers using terminals at distribution broker 107 to obtain and process relevant data. Other types of data can also flow to the inventors 108; for example, delayed FX certificate and FX warrant pricing information may be provided by the information vendor 111, or the distribution broker 107.

The trade processor 103, in cooperation with the management system 104, can also control the issue FX covered warrant products. For example, issue may be in tranches having a set issue size, issue price, strike price, warrant type, and maturity date. In some implementations, a single entity can function as an issuer of the FX certificate and as a market maker for the FX covered warrant product.

Information dissemination by the trade processing system 103 and system 104 may be controlled by a price management and monitoring system 109. The system 109 may be configured to automatically halt trading of the covered warrant product when a price change for the covered warrant product exceeds a first threshold. The price management system can be further configured to halt dissemination of price information from the system 104 or from the trade processing system 103 when a change in a reference price of the FX certificate exceeds a set threshold. This may be accomplished by monitoring a change in underlyer price based on a previous closing price and halting investor trading when a rate of change of the underlyer price during a pricing window exceeds a permissible rate of change. A change from a reference certificate price may be measured over a second window of time (which may, but is not required to be, the same as the first window of time). One reason for doing this is to halt trading where the rate of price change fluctuations suggest that erroneous data is being received from an external information source (i.e., rate source 102).

The foreign exchange index upon which the FX Certificates are based can represent fluctuations in value between any suitable currencies. For example, Japanese Yen/United States Dollar valuations. Preferably, the index is derived from a real-time values of such currency exchange rates as provided from an existing exchange. In a preferred implementation, prices of FX certificates and FX covered warrants are disseminated through multiple channels including through information vendors, distributing brokers, and direct dissemination from the FX calculation engine, and others.

As will be appreciated, the present methodology provides a mechanism whereby covered warrants on a zero-coupon certificate is issued in a way that permits investors to participate in a price changes that occur on a foreign exchange market while not requiring that the covered warrant rely directly on a foreign exchange rate as an underlyer. More generally, the invention provides the ability to issue a financial product which acts as if it were based on a particular underlyer without being directly based on that underlyer.

Another warrant implementation, referred to herein as a FX eWarrant, is structured to link USD/JPY currency exchange rate fluctuation using indexed floating rate notes (e.g., five (5) US Dollar notes) as an underlyer. This underlying index will be referred to herein as an "FX Index." In this example, the same entity acts as both the issuer and the market maker, for the FX eWarrant covered warrant product.

In an implementation for FX eWarrant's offered in Japan, the FX eWarrant structure may be as follows:
  (a) The constituents of the FX Index are USD floating rate notes issued by foreign entities and considered as corporate issue bond. Such a corporate issue bond is considered as a valuable securities under the Japanese Securities Exchange Act Chapter 1 Section 2 Subsection 4 and under Subsection 9.
  (b) The "FX Index" is a price index of a group of corporate issue bonds described in (a) and can also be considered as valuable securities. (SEL, Chapter 1 Subsection 10-2 and Paragraph 23-1 "Valuable Securities OTC Option Trade—OTC Index Forward Trade" applies.).
  (c) The resulting covered warrant is an securitized option having valuable securities as an underlyer. Therefore, a FX eWarrant, an option having a FX Index as an underlyer, can be considered as Covered Warrant.

Figure 4:
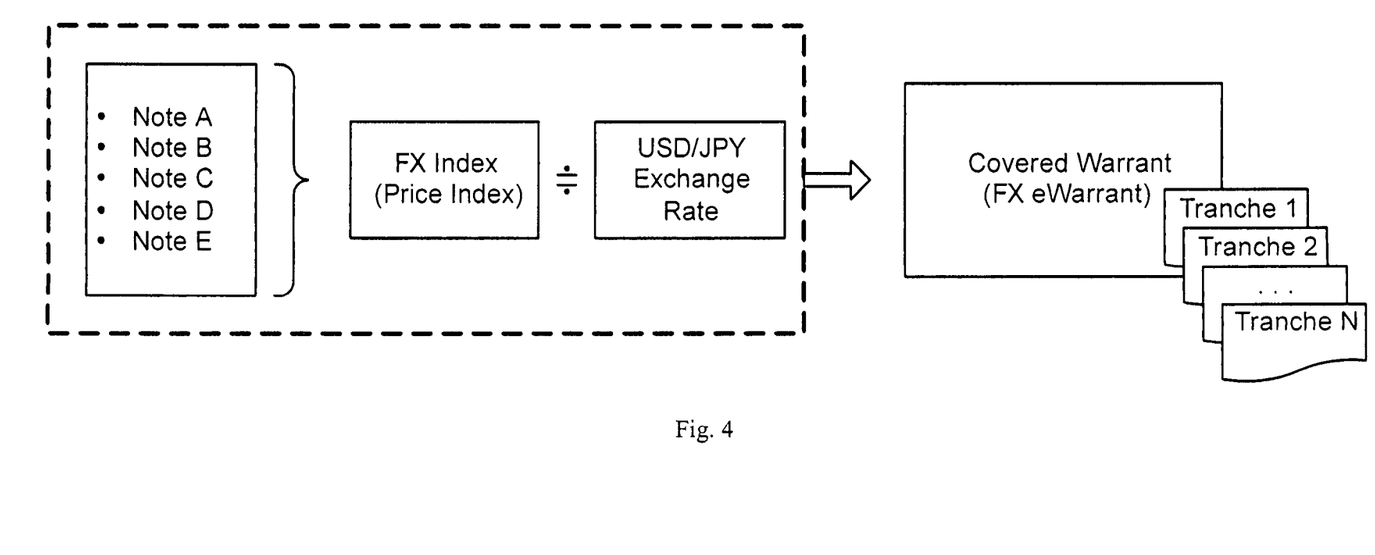
FIG. 4 shows an exemplary relationship of elements relating to issue of a financial product.

For the overview of this structure, refer to FIG. 4.

Underlyer Index Constituents Example

As an example of the FX eWarrant structure, five USD floating rate notes will be selected based on the selection criteria described above. These five notes are shown in the following table:

TABLE 1

Index Constituents Sample

| Issuer | Note A<br>Bank of<br>America | Note B<br>Bank One<br>Corp | Note C<br>Lehman Brothers<br>Holdings | Note D<br>CitiCorp | Note E<br>Ford Motor<br>Credit Co. |
|---|---|---|---|---|---|
| Interest rate: | Floating | Floating | Floating | Floating | Floating |
| Currency: | USD | USD | USD | USD | USD |
| Maturity: | Sep. 9, 2005 | Dec. 29, 2005 | Sep. 28, 2005 | Oct. 25, 2005 | Apr. 28, 2005 |
| Issue Price: | $100.028 | $100.000 | $99.789 | $100.000 | $99.870 |
| Coupon Rate: | 5.19875% | 5.12500% | 5.36875% | 5.22500% | 5.87500% |
| Calculation: | Quarterly | Quarterly | Quarterly | Quarterly | Quarterly |
| Base Rate: | 3 mo. LIBOR | 3 mo. LIBOR | 3 mo. LIBOR | 1 mo. LIBOR | 3 mo. LIBOR |
| Spread: | +12.5 bp | +25 bp | +50 bp | +22.5 bp | +18.75 bp |
| Moody's Rating: | Aa2 | A1 | A2 | A1 | Aa3 |
| S&P Rating: | A+ | A− | A | A+ | A+ |
| Market Price (mid price @ Apr. 23, 2001) | $99.0000 | $99.1400 | $99.1000 | $99.1300 | $97.5600 |

Price Calculation for FX eWarrant

A price for a FX eWarrant may be calculated as follows:
A price multiplier may be set by:
1) Dividing 1.00 by the sum of mid prices of index constituents (shown as A) on the reference date in the example below.
2) Recalculating the multiplier when a redemption or a new addition of note happen using latest index figure in place of 1.00 to keep continuity of the index.

Pricing for this covered warrant will be provided in Japanese yen by multiplying the FX Index (which has a total value scaled to equal 1.0000—as shown in Table 2, below) with USD/JPY spot exchange rate. Under this scheme, the FX eWarrant will be "linked" to exchange rate and directly reflect the daily rate fluctuation. (Example: USD/JPY spot rate as of April, $23^{rd} \times$ FX Index=121.25 $A \times 1.0000$=121.25 This will be the quoted price of FX eWarrant in terms of Japanese Yen.) Since FX Index will always be maintained very close to 1.00, the correlation between the index and the exchange rate will be guaranteed.

TABLE 2

Index Constituents Price & Weight at Issue

| Note | Mid-Price ($) | Multiplier | Mid Price × Multiplier |
|---|---|---|---|
| A | 99.0000 | 0.002025 | 0.2004 |
| B | 99.1400 | 0.002025 | 0.2007 |
| C | 99.1000 | 0.002025 | 0.2006 |
| D | 99.1300 | 0.002025 | 0.2007 |
| E | 97.5600 | 0.002025 | 0.1975 |
| Total | $ 493.9300 | | 1.0000 |

Issuing FX eWarrant

The issuing scheme for this implementation of a covered warrant may be substantially identical to that for covered warrants having stocks and stock index as underlyers. FIG. 5 details terms and conditions for an issuance (issue size, issue price, strike, warrant type, maturity, etc.).

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

The invention has been described above in terms of its preferred implementation and embodiments. However, various changes in the form and details can be made without departing from the spirit and scope of the invention. For example, while the invention has been discussed in terms foreign exchange underlyers, the disclosed methodology can also be implemented to apply to other types of underlyers such as interest rate, cruide oil prices and gold price underlyers. Further, though the system 100 has been shown as consisting of multiple discrete processing systems, these systems may be integrated into a single computer system. For example, functions implemented by components 104, 101, 110, 109, 103, 112 may be implemented in a single computer. Similarly, functions may be subdivided across multiple systems. For example, processing functions of components 101 and 110 may take place at geographically separated computers.

What is claimed is:

1. A computer processor implemented method for structuring a financial product, the method comprising:
   structuring, via a computer processor, a foreign exchange certificate, wherein said foreign exchange certificate has a redemption value that is determined via the processor based on a difference between an exchange rate of a first currency for a second currency at an issue date of the foreign exchange certificate and an exchange rate of the first currency for the second currency at a maturity date of the foreign exchange certificate; and
   issuing, via the computer processor, a foreign exchange covered warrant financial product, wherein said foreign exchange covered warrant financial product has a price calculated based on the redemption value of the foreign exchange certificate, and wherein said foreign exchange certificate is an underlyer for said foreign exchange covered warrant financial product.

2. The method of claim 1, wherein the foreign exchange certificate comprises a zero-coupon certificate.

3. The method of claim 2, wherein the redemption value is an amount by which a first value at the maturity date exceeds a strike price of the foreign exchange covered warrant financial product, and wherein said first value is dependent on the exchange rate of the first currency for the second currency at the maturity date.

4. The method of claim 3, wherein the redemption value is zero if the first value is less than the strike price.

5. The method of claim 4, wherein the first value is structured to have a value equal to a spot currency exchange rate.

6. The method of claim 5, wherein the foreign exchange certificate is structured as a debenture.

7. The method of claim 6, wherein the foreign exchange certificate operates to securitize a foreign exchange option.

8. A computer processor implemented method for issuing a financial product, the method comprising:
   structuring, via a computer processor, a zero-coupon foreign exchange certificate, wherein said zero-coupon foreign exchange certificate has a redemption value that is determined via the computer processor based on a difference between an exchange rate of a first currency for a second currency at an issue date of the zero-coupon foreign exchange certificate and an exchange rate of the first currency for the second currency at a maturity date of the zero-coupon foreign exchange certificate; and
   issuing, via the computer processor, a foreign exchange covered warrant financial product, wherein said foreign exchange covered warrant financial product has a price calculated based on the redemption value of the zero-coupon foreign exchange certificate, and wherein said zero-coupon foreign exchange certificate is an underlyer for said foreign exchange covered warrant financial product.

9. The method of claim 8, further comprising:
   calculating a value of the foreign exchange certificate at a time of offering of the zero-coupon foreign exchange certificate based on a data feed received from a computerized foreign exchange trading system.

10. The method of claim 9, wherein the data feed is received in real-time.

11. The method of claim 10, further comprising:
    receiving a foreign exchange rate, a funding rate, and a charging rate at a computerized trading system; and
    determining a price of the zero-coupon foreign exchange certificate based on the foreign exchange rate, the funding rate, the charging rate, and a date of redemption.

12. The method of claim 8, wherein:
    a single entity functions as an issuer of the zero-coupon foreign exchange certificate and as a market maker for the foreign exchange covered warrant financial product;
    the foreign exchange covered warrant financial product is issued in tranches each having a set issue size, an issue price, a strike price, a warrant type, and a maturity date; and
    said issue in tranches is managed by a computerized trading system.

13. The method of claim 12, further comprising:
    monitoring a change in a price of the underlyer for the foreign exchange covered warrant financial product based on a previous closing price; and
    halting investor trading when a rate of change of the price of the underlyer for the foreign exchange covered warrant financial product exceeds a permissible rate of change during a pricing window.

14. The method of claim 8, wherein structuring the zero-coupon foreign exchange certificate comprises structuring a bid-offer spread enabling operation of the zero-coupon foreign exchange certificate as an investor trading vehicle.

15. The method of claim 14, wherein the zero-coupon foreign exchange certificate has an associated strike price comprising a price per share at which an underlying asset may be purchased in the case of a call or sold in the case of a put by a holder of the zero-coupon foreign exchange certificate upon exercise of an associated option contract.

16. The method of claim 8, wherein the zero-coupon foreign exchange certificate is structured as a debenture, and wherein the zero-coupon foreign exchange certificate securitizes a foreign exchange option.

17. A computer-implemented method for offering a financial product, the method comprising:
    receiving, via a computer, a data feed comprising foreign exchange rate data;
    structuring a zero-coupon foreign exchange certificate based at least in part on the received data feed;
    computing, via the computer, a price of the zero-coupon foreign exchange certificate with a redemption value, wherein the price of the zero-coupon foreign exchange certificate is calculated based on the redemption value of the zero-coupon foreign exchange certificate, and wherein the redemption value of the zero-coupon foreign exchange certificate is determined based on a difference between an exchange rate of a first currency for a second currency at an issue date of the zero-coupon foreign exchange certificate and an exchange rate of the first currency for the second currency at a maturity date of the zero-coupon foreign exchange certificate;
    computing a price of a foreign exchange covered warrant, wherein the price of the foreign exchange covered warrant is based on the price of the zero-coupon foreign exchange certificate, and wherein the zero-coupon foreign exchange certificate is an underlyer for the foreign exchange covered warrant; and
    transmitting offer data to an investor, wherein said offer data comprises information descriptive of the foreign exchange covered warrant.

18. The method of claim 17, further comprising:
    receiving a request for an offer of the foreign exchange covered warrant; and
    transmitting the offer data in response to the request.

19. A financial data processing apparatus comprising:
a foreign exchange certificate management system comprising:
 a computer system configured to structure a zero-coupon foreign exchange certificate, wherein said zero-coupon foreign exchange certificate comprises a price computed based on a data feed received from a foreign exchange trading system, wherein said price of said zero-coupon foreign exchange certificate is calculated based on a redemption value of said zero-coupon foreign exchange certificate, and wherein said zero-coupon foreign exchange certificate has the redemption value that is determined based on a difference between an exchange rate of a first currency for a second currency at an issue date of the zero-coupon foreign exchange certificate and an exchange rate of the first currency for the second currency at a maturity date of the zero-coupon foreign exchange certificate;
a covered warrant management processor comprising:
 a computer system configured to structure a foreign exchange covered warrant financial product based on an underlyer for the foreign exchange covered warrant financial product, wherein the underlayer for the foreign exchange covered warrant financial product comprises the zero-coupon foreign exchange certificate structured by the foreign exchange certificate management system, and wherein the foreign exchange covered warrant financial product has a price calculated based on the redemption value of the zero-coupon foreign exchange certificate; and
a trade processing system comprising:
 a database configured to store buy and sell related data and track investor portfolio information; and
 a user interface system configured to enable interaction with a user by generating user interface display screens.

20. The apparatus of claim 19, wherein the trade processing system further comprises:
 a price management system configured to automatically halt trading of the foreign exchange covered warrant financial product when a price change for the foreign exchange covered warrant financial product exceeds a first threshold.

21. The apparatus of claim 20, wherein the price management system is further configured to halt dissemination of price information when a change in a reference price of the underlyer for the foreign exchange covered warrant financial product exceeds a second threshold.

22. The apparatus of claim 21, wherein a price change for the foreign exchange covered warrant financial product is measured over a first window of time and the change in the reference price is measured over a second window of time.

* * * * *

UNITED STATES PATENT AND TRADEMARK OFFICE
CERTIFICATE OF CORRECTION

PATENT NO. : 8,650,102 B2  
APPLICATION NO. : 10/480984  
DATED : February 11, 2014  
INVENTOR(S) : Doi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1430 days.

Signed and Sealed this

Twenty-ninth Day of September, 2015

Michelle K. Lee
*Director of the United States Patent and Trademark Office*